(12) United States Patent
Riedinger

(10) Patent No.: US 8,046,118 B2
(45) Date of Patent: Oct. 25, 2011

(54) CONVERTER FOR CONVERTING A LOAD FACTOR COMMAND INTO A LONGITUDINAL ATTITUDE DEVIATION INSTRUCTION

(75) Inventor: Marc Riedinger, Plaisance du Touch (FR)

(73) Assignee: Thales (FR)

( * ) Notice: Subject to any disclaimer, the term of this patent is extended or adjusted under 35 U.S.C. 154(b) by 445 days.

(21) Appl. No.: 12/307,221

(22) PCT Filed: Jun. 20, 2007

(86) PCT No.: PCT/EP2007/056125
§ 371 (c)(1),
(2), (4) Date: Feb. 12, 2009

(87) PCT Pub. No.: WO2008/003591
PCT Pub. Date: Jan. 10, 2008

(65) Prior Publication Data
US 2009/0287365 A1    Nov. 19, 2009

(30) Foreign Application Priority Data
Jul. 7, 2006  (FR) ..................... 06/06221

(51) Int. Cl.
*B64C 13/16* (2006.01)
*G01C 23/00* (2006.01)
*G05D 1/06* (2006.01)

(52) U.S. Cl. ............... 701/5; 701/4; 701/8; 244/76 R
(58) Field of Classification Search ............ 701/5, 4, 701/8, 3; 244/76 R, 213; 340/963
See application file for complete search history.

(56) References Cited

U.S. PATENT DOCUMENTS

| 5,213,282 | A |   | 5/1993 | Gold et al. |
| 5,823,479 | A | * | 10/1998 | Nield et al. ............ 244/187 |
| 6,273,370 | B1 | * | 8/2001 | Colgren ............. 244/181 |
| 2004/0010354 | A1 | * | 1/2004 | Nicholas et al. ............ 701/4 |

FOREIGN PATENT DOCUMENTS

| EP | 0485263 | 5/1992 |
| FR | 2747204 | 10/1997 |
| FR | 2841008 | 12/2003 |
| FR | 2874204 | 2/2006 |

* cited by examiner

*Primary Examiner* — Tan Q Nguyen
(74) *Attorney, Agent, or Firm* — Lowe Hauptman Ham & Berner, LLP

(57) ABSTRACT

The invention relates to flight control systems for aircraft, which have large control loops delivering load factor commands and which are applied to flight controls more suited to the following by the pilot of a longitudinal attitude deviation instruction than to the following of a load factor instructions. It consists of a small control loop generating a deviation indicator displayed by the flight director on the PFD screen, with a converter for converting a controlled load factor into a longitudinal attitude deviation instruction comprising a bandpass filter allowing the integration for the calculation of the longitudinal attitude deviation instruction value in the piloting frequency span only.

9 Claims, 3 Drawing Sheets

CONVERTER FOR CONVERTING A LOAD FACTOR COMMAND INTO A LONGITUDINAL ATTITUDE DEVIATION INSTRUCTION

CROSS-REFERENCE TO RELATED APPLICATIONS

The present Application is based on International Application No. PCT/EP2007/056125, filed on Jun. 20, 2007, which in turn corresponds to French Application No. 0606221, filed on Jul. 7, 2006, and priority is hereby claimed under 35 USC §119 based on these applications. Each of these applications are hereby incorporated by reference in their entirety into the present application.

FIELD OF THE INVENTION

The invention relates to avionics and, more precisely, flight control systems ensuring the automatic pilot and flight director functions.

BACKGROUND OF THE INVENTION

Flight control systems are automation facilities making it possible, in their basic operating modes, to bring an aircraft into and maintain it in a flight configuration corresponding to a predetermined speed vector and/or trim vector, and, in so-called "higher" operating modes, to bring an aircraft onto a type of predefined trajectory. They act on the flight controls, either directly, when they operate as automatic pilot, or by way of the pilot whom they provide with instructions, when they operate as flight director. They incorporate computers programmed to estimate the deviations existing between the trim, the speed vector or the current trajectory of the aircraft with respect to a trim, a speed vector or an instruction trajectory and to deduce therefrom the orders to be executed by the flight controls or the direction and amplitude of the maneuvers to be advised to the pilot so as to reduce these deviations.

In order to imitate the behavior of a pilot as closely as possible, flight control systems are designed with two levels of control loops: a first level of control loops termed "large loop" determining the values that must be taken by the primary flight parameters used by pilots when flying by instruments to reach the correct altitude, speed vector or trajectory, and a second level of control loops termed "small loop" translating the parameter values delivered by the large loop, either into commands for the actuators controlled by the flight controls for automatic-pilot operation, or into indications of deviation to be corrected, displayed in the cockpit, on the PFD screen for viewing the primary flight parameters for flight-director operation.

With conventional flight controls, having simple mechanical, hydraulic and/or electrical assistance, comprising a stick allowing the pilot to prescribe the position of the airfoils and admitting the longitudinal attitude angle as primary control parameter in the vertical plane, flight control systems comprise, for controlling the trajectory parameters in their various operating modes, large loops delivering longitudinal attitude angle commands utilized by small loops delivering, during automatic-pilot operation, the signals for actuating the controls and, during flight-director operation, a longitudinal attitude instruction made available to the pilot on the PFD screen.

With electric flight controls (fly-by-wire) comprising a stick or lever allowing the pilot to enter, in relation to the vertical axis, instructions regarding load factor, which is likened hereinafter to a vertical acceleration although in all strictness, a cosine coefficient due to the angle of roll comes into the relation which links them, and therefore admitting the load factor as primary flight parameter instead of the longitudinal attitude angle, flight control systems comprise, for controlling the trajectory parameters in their various operating modes, large loops delivering load factor commands utilized by small loops delivering, during automatic-pilot operation, the signals for actuating the controls and, during flight-director operation, a load factor instruction made available to the pilot on the PFD screen.

It is apparent that, during automatic-pilot operation, flight control systems with large loops delivering load factor commands are more reactive than those with large loops delivering longitudinal attitude angle deviation commands, so that it would be beneficial to adapt them to conventional flight controls were it not for the pilot's difficulty in following a load factor instruction with conventional flight controls that are more appropriate to the following of longitudinal attitude angle instructions.

SUMMARY OF THE INVENTION

An object of the present invention is to solve the aforesaid adaptation problem by furnishing a flight control system provided with large loops delivering load factor commands, with small loops converting a load factor command arising from a large loop into a longitudinal attitude deviation instruction intended to be made available to a pilot operating with conventional flight controls admitting the longitudinal attitude angle as primary flight parameter in the vertical plane.

The invention is directed to a converter, for aircraft, for converting a load factor command $N_{zc}$ into a longitudinal attitude deviation instruction $\Delta\theta_c$ comprising a longitudinal attitude deviation generator circuit with:

an integrator applying the simplified relation of flight mechanics linking the load factor $N_{zc}$ to a longitudinal attitude deviation $\Delta\theta_c$:

$$\Delta\theta_c = \frac{\alpha}{TAS} \cdot \int \left( N_{zc} + \tau_\gamma \cdot \frac{dN_{zc}}{dt} \right) dt$$

$\alpha = 180/\pi$ being a coefficient for converting radians into degrees,
$\tau_\gamma$ the aircraft's trajectory constant and
TAS the true air speed of the aircraft considered, and
a high-pass filter restoring in the long term, to a constant value, the longitudinal attitude deviation instruction value provided by the integrator.

Advantageously, the high-pass filter has a time constant $\tau_w$ of the order of 12 seconds, depending on the type of aircraft.

Advantageously, the integrator and the high-pass filter are combined into a first-order bandpass filter having a high cutoff frequency equal to $1/2\pi\tau_{65}$, and a low cutoff frequency equal to $1/2\pi\tau_w$ associated with an amplifier-attenuator having a gain equal to:

$$\frac{\alpha \times \tau_w}{TAS}$$

Advantageously, the converter furthermore comprises a longitudinal attitude deviation instruction generator circuit comprising a second high-pass filter receiving a current value of longitudinal attitude angle and tending to restore it to the zero value, a subtracter circuit with an additive input connected at the output of the second high-pass filter and a subtractive input connected at the output of the longitudinal attitude deviation generator circuit, and, at the output of the subtracter circuit, a low-pass filter.

Advantageously, the second high-pass filter has a time constant $\tau_{w\theta}$ whose value is of the same order of magnitude as the time constant $\tau_w$ of the high-pass filter of the longitudinal attitude deviation generator circuit.

Advantageously, the longitudinal attitude deviation instruction generator circuit comprises adjustment amplifiers-attenuators inserted at the output of the second high-pass filter and at the output of the low-pass filter.

Advantageously, the low-pass filter of the longitudinal attitude deviation instruction generator circuit possesses a first-order transfer function with a time constant $\tau_f$ of the order of 0.8 s.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

a FIG. 1 is a diagram siting a flight control system in its environment within the equipment of an aircraft, a FIG. 2 represents a PFD display screen for the primary flight parameters displaying an attitude instruction bar, a FIG. 3 is a basic diagram of a converter according to the invention, a FIG. 4 is a second basic diagram of a converter according to the invention stemming by simplification from that of FIG. 3, and a FIG. 5 is a curve chart illustrating the behavior of a filter used for converting a load factor into a longitudinal attitude deviation.

DETAILED DESCRIPTION OF PREFERRED EMBODIMENT

Figure 1:
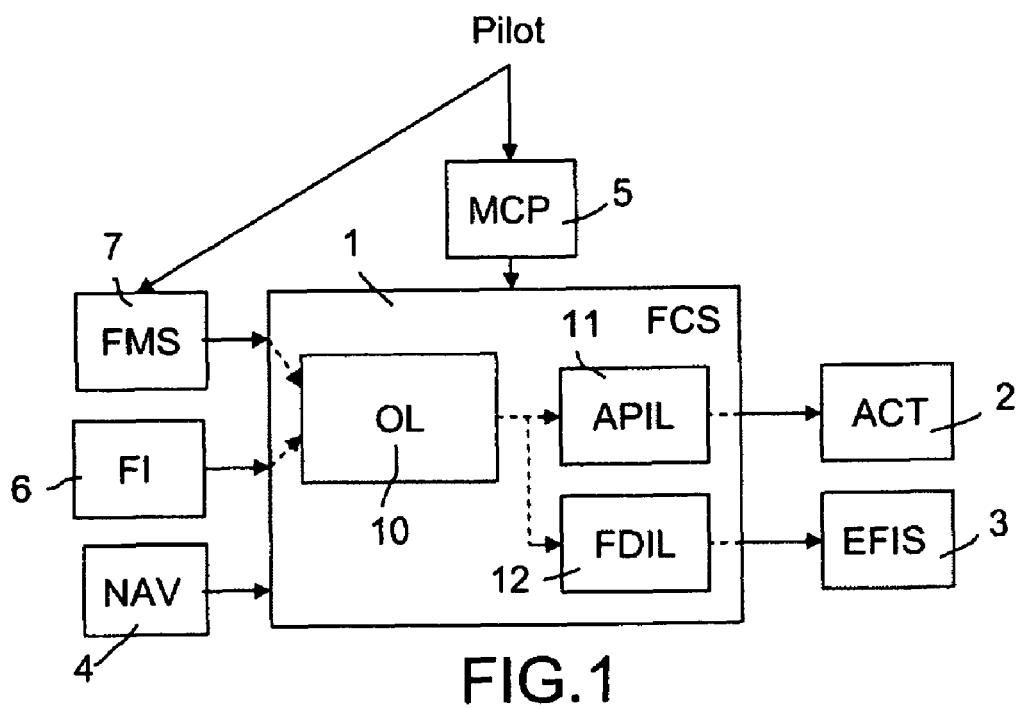

A flight control system FCS 1 provides piloting assistance allowing an aircraft to be maintained in various predefined types of flight configuration corresponding to a predetermined trim and/or speed vector (basic modes) or to predetermined trajectories (higher modes). It can operate either as automatic pilot AP, or as flight director FD. When it operates as automatic pilot, it acts directly on the actuators for positioning the airfoils ACT 2. When it operates as flight director, it provides the pilot, by way of the displays of the flight equipment EFIS 3 of his instrument panel, with the piloting instructions relating to the adjustment of the primary flight parameters. It is controlled by the pilot, by way of a man-machine interface MCP 5 with indicator lights, buttons and switches making it possible to select and to parametrize one of its operating modes. It consists of one or more computers formulating the orders for the actuators of the airfoils and the piloting instructions as a function of its parametrization at the time and the information about the current speed, trim, altitude, deviation with respect to an approach or navigation beam and heading of the aircraft, as provided by the flight equipment FI 6, information about the envisaged flight plan, as provided by the FMS navigation computer 7, or radio-navigation deviations provided by radioelectric receivers NAV 4.

As recalled previously, the flight control system 1 possesses two levels of control loops: a first level of control loops termed "large loop" OL 10, one per mode, determining the values that must be taken by the primary flight parameters used by pilots when flying by instruments to reach the heading, at the correct altitude and at the correct speed, and a second level of control loops termed "small loop" translating the parameter values delivered by the large loop, either, for those of APIL type 11, into commands for the actuators of the airfoils ACT 2 during automatic-pilot operation PA, or for those FDIL 12 into indications of deviation to be corrected displayed in the cockpit, on the screens of the flight equipment EFIS 3, notably the PFD screen for viewing the primary flight parameters during flight-director operation FD.

In the modes calling upon flight control in the vertical plane, the flight control system 1 possesses a large loop OL 10 delivering a vertical acceleration or load factor instruction $N_{zc}$ in the guise of primary flight parameter and two small loops:

a small loop APIL 11 translating, during automatic-pilot operation PA, the load factor instruction $N_{zc}$ delivered by the large loop APIL into commands for the actuators of the airfoils (elevators) ACT 2, and a small loop FDIL 12 translating, during flight-director operation, the load factor instruction $N_{zc}$ delivered by the large loop OL into a deviation indicator FDcmd displayed in the cockpit, on the PFD viewing screen displaying the primary flight parameters used by the pilot in the event of piloting without visibility.

Figure 2:
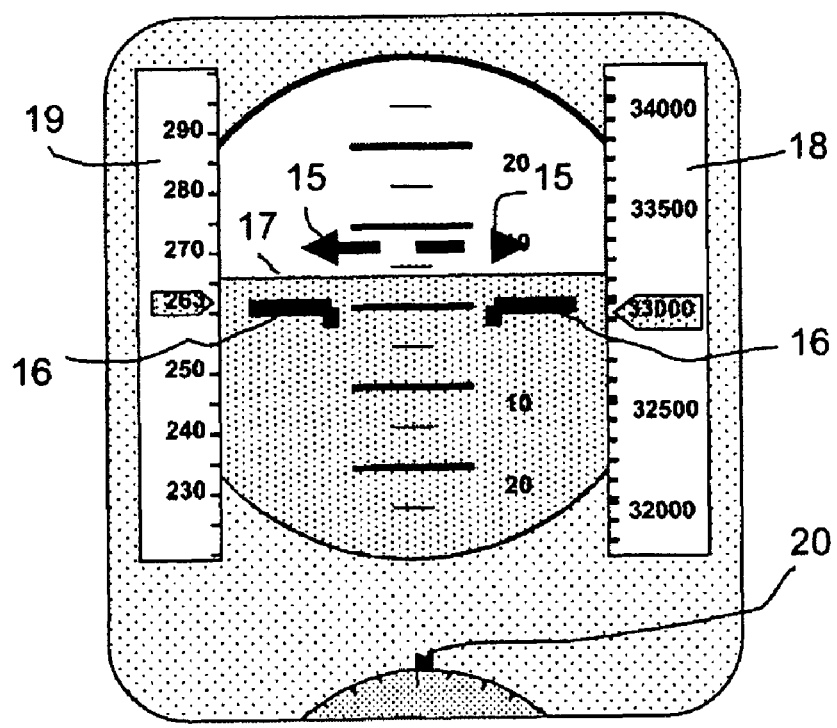

The deviation indicator FDcmd displayed on the PFD viewing screen for a flight control in the vertical plane can be, for example, as represented in FIG. 2, a horizontal bar 15 moving in the vertical plane, that the pilot must endeavor to align with the aircraft mockup 16, while monitoring the artificial horizon 17, the altitude indicator 18 placed to the right, the speed indicator 19 placed to the left and the heading indicator 20 disposed beneath or above.

The small loop APIL 11 consists of feedback loops taking into account the reactions of the actuators and the effectiveness of the airfoils. It will not be detailed since its structure depends intimately on characteristics of the actuators and airfoils. It is formulated according to the usual procedures used in the technique of feedback control while searching for a response time that is as small as possible while avoiding hunting.

With "fly-by-wire" electric flight controls where the pilot is provided with a stick or lever whose longitudinal displacement corresponds to a modification of the load factor and where the relation between displacement of the lever and modification of the load factor is intuitive, the small loop FDIL is of simple design since a deviation indicator FDcmd representative of the difference existing between the vertical acceleration instruction, which is a load factor instruction and the current load factor measured by the flight instruments FI 7 is entirely indicated.

Figure 3:
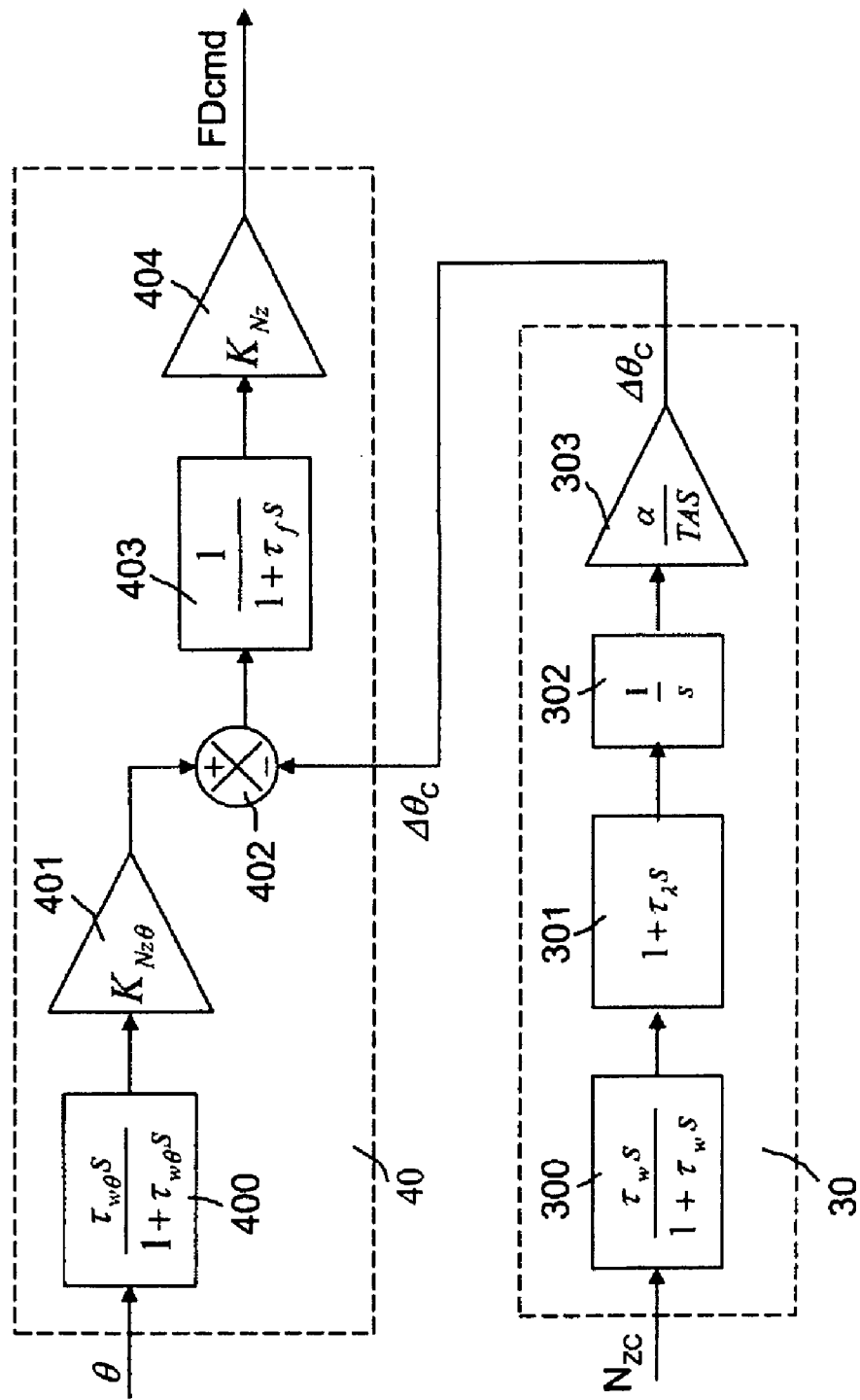

With conventional flight controls having simple mechanical, hydraulic and/or electrical assistance, comprising a stick allowing the pilot to prescribe the position of the airfoils and flaps and where a longitudinal displacement of the stick is concerned more with a change of longitudinal attitude than with a modification of the load factor, a deviation indicator FDcmd representative of the difference existing between a load factor instruction and the current load factor is no longer suitable and must be replaced with a deviation indicator FDcmd representative of the modification of longitudinal attitude angle making it possible to follow the load factor instruction delivered by the large loop OL 10. The small loop FDIL 12 must fulfill the function of a load factor to attitude deviation converter. As represented in FIG. 3, it is then composed of a converter 30 for converting load factor into longitudinal attitude deviation associated with a longitudinal attitude deviation instruction generator 40 delivering a deviation indicator displayed on the PFD screen for viewing the primary flight parameters.

The converter 30 implements the following simplified relation of flight mechanics linking the load factor $N_{zc}$ to the longitudinal attitude deviation $\Delta\theta_c$:

$$\Delta\theta_c = \frac{\alpha}{TAS} \cdot \int \left(N_{zc} + \tau_\gamma \cdot \frac{dN_{zc}}{dt}\right) dt$$

$\alpha = 180/\pi$ being a radians/degrees conversion coefficient,
$\tau_\gamma$ the aircraft's trajectory constant and
TAS being the true air speed.

This relation may also be written, using the Laplace operator s and taking account of the computer-based implementation which involves sampling for digitizing the load factor instruction $N_{zc}$:

$$\Delta\theta_c = \frac{a}{TAS} \cdot \frac{1 + \tau_\gamma \cdot s}{s} N_{zc} \quad (1)$$

with a sampling time constant $\tau_\gamma$ of the order of 0.5 to 2 seconds taking account of the characteristics of the aircraft.

For the implementation of this relation (1), the converter 30 can comprise, as shown in FIG. 3, a high-pass filter 301 defined by the first-order transfer function:

$$1 + \tau_\gamma s$$

followed by an integrator circuit 302 and by an amplifier 303 having a variable gain equal to:

$$\frac{\alpha}{TAS}$$

To take account of the potential for divergence of the integration operation performed on the load factor $N_{zc}$ immediately the latter is not rigorously zero and to contrive matters so that the longitudinal attitude deviation instruction $\Delta\theta_c$ does not diverge when the pilot does not follow the deviation indicator FDcmd over the long term, typically over a duration of more than 12 seconds, a high-pass filter 300 restoring in the long term, to zero, the value before integration for the calculation of $\Delta\theta_c$ is added to the converter 30. This high-pass filter 300 exhibits the following transfer function:

$$\frac{\tau_w s}{1 + \tau_w s}$$

the time constant $\tau_w$ being of the order of 12 seconds for a middle of the range transport aircraft.

Ultimately, the longitudinal attitude angle value $\Delta\theta_c$ delivered by the converter 30 on the basis of the load factor $N_{zc}$ complies with the following defining relation, expressed in terms of Laplace operator s:

$$\Delta\theta_c = \frac{\alpha}{TAS} \cdot \frac{1 + \tau_\gamma s}{s} \cdot \frac{\tau_w s}{1 + \tau_w s} \cdot N_{zc} \quad (1)$$

Figure 4:
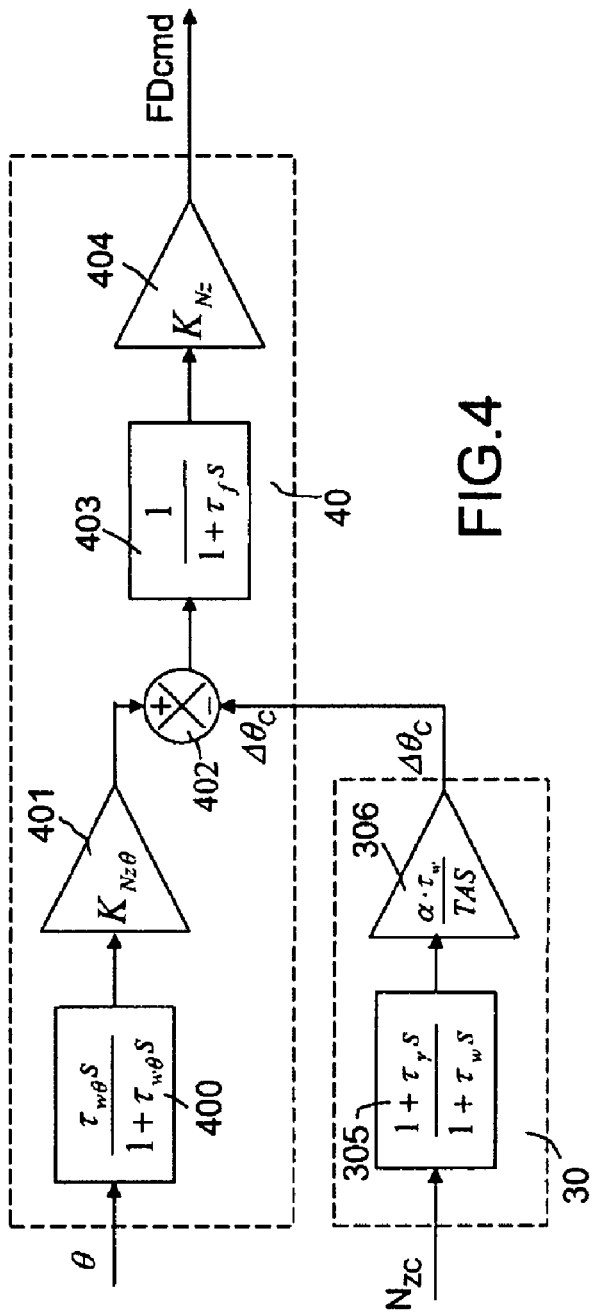

Relation (1) simplifying into the form:

$$\Delta\theta_c = \frac{\alpha}{TAS} \cdot \frac{1 + \tau_\gamma s}{1 + \tau_w s} \cdot \tau_w \cdot N_{zc} \quad (2)$$

the load factor to longitudinal attitude angle converter 30 can also be decomposed, as represented in FIG. 4, into a bandpass filter 305 defined by the first-order transfer function:

$$\frac{1 + \tau_\gamma s}{1 + \tau_w s}$$

followed by an amplifier 306 having a variable gain equal to:

$$\frac{\alpha \tau_w}{TAS}$$

Figure 5:
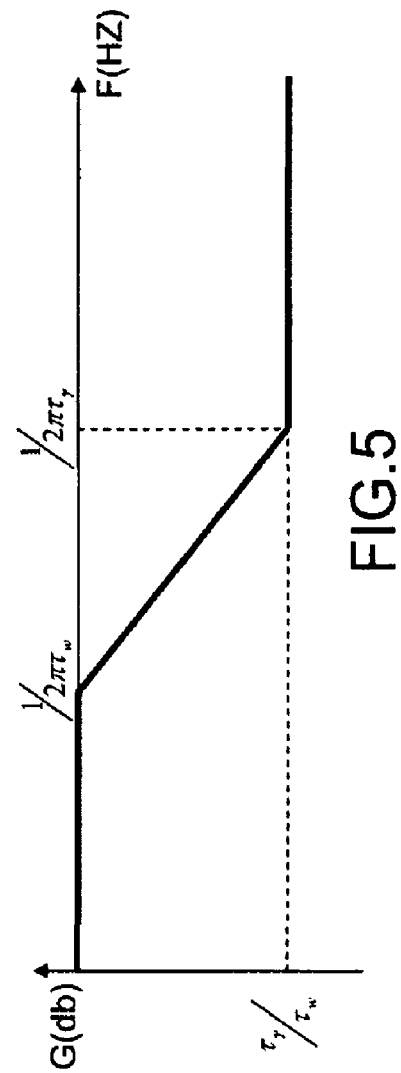

FIG. 5 shows the Bode diagram of the bandpass filter 305 which effects the integration of the load factor between the piloting frequencies $1/2\pi\tau_\gamma$ and $1/2\pi\tau_w$. The bandpass filter 305 exhibits a transfer gain equal to unity for the lower frequencies, and equal to $\tau_\gamma/\tau_w$ for the higher frequencies.

The flight director command generator 40 operates on the basis of the observed difference between the current longitudinal attitude deviation $\theta$ measured by the flight equipment FI 6 (FIG. 1) and the longitudinal attitude deviation instruction $\Delta\theta_c$ delivered by the load factor to longitudinal attitude deviation converter 30. More precisely, it operates on the basis of a measurement of current longitudinal attitude angle subjected beforehand, on the one hand, to a high-pass filter bringing its long-term value back to zero and, on the other hand, to an amplitude adjustment of an adjustment coefficient $K_{Nz\theta}$, and delivers a deviation signal subjected beforehand to a first-order low-pass filtering and to an amplitude adjustment of an adjustment coefficient $K_{Nz}$.

Ultimately, the longitudinal attitude deviation generator 40 delivers a deviation indicator FDcmd complying with the defining relation:

$$FDcmd = K_{Nz} \cdot \frac{1}{1 + \tau_f s} \cdot \left(K_{Nz\theta} \cdot \frac{\tau_{w\theta} s}{1 + \tau_{w\theta} s} \cdot \theta - \Delta\theta_c\right)$$

and can be decomposed, as represented in FIGS. 3 and 4, into:
a high-pass filter 400 operating on the measured longitudinal attitude angle $\theta$ and defined by the first-order transfer function:

$$\frac{\tau_{w\theta} s}{1 + \tau_{w\theta} s}$$

whose time constant $\tau_{w\theta}$ is of the same order of magnitude as the time constant $\tau_w$, an adjustment amplifier-attenuator 401 connected following the damping filter 400 and introducing an amplitude adjustment coefficient $K_{Nz\theta}$, a subtracter circuit 402 receiving on an additive input the measurement of current longitudinal attitude angle transmitted by the amplifier-attenuator 401 and on a subtractive input the longitudinal attitude deviation instruction $\Delta\theta_c$ delivered by the load factor to longitudinal attitude deviation converter 30, a low-pass filter 403 connected at the output of the subtracter circuit 402 and defined by the first-order transfer function:

$$\frac{1}{1+\tau_f s}$$

$\tau_f$ being a time constant of the order of 0.8 seconds making it possible to obtain a smoothed movement for the deviation indicator FDcmd, and an adjustment amplifier-attenuator 404 connected following the low-pass filter 403 and introducing an amplitude adjustment coefficient $K_{Nz}$.

The adjustment coefficients $K_{Nz}$ and $K_{Nz\theta}$, as well as the time constants $\tau_\gamma$, $\tau_w$, $\tau_{w\theta}$ and $\tau_f$ are set as a function of the characteristics of the aircraft and of the mode considered, by flight simulator trials.

The load factor to longitudinal attitude deviation instruction converter 30 and the longitudinal attitude deviation generator 40 are made according to the conventional techniques for constructing digital filters on the basis of transfer functions expressed in terms of Laplace operator s, optionally via the z-transform.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A converter, for aircraft, for converting a load factor command $N_{zc}$ into a longitudinal attitude deviation instruction $\Delta\theta_c$ comprising a longitudinal attitude deviation generator circuit with:

a variable-gain integrator applying the flight mechanics relation linking the load factor $N_{zc}$ to the longitudinal attitude deviation $\Delta\theta_c$:

$$\Delta\theta_c = \frac{\alpha}{TAS} \cdot \int \left( N_{zc} + \tau_\gamma \cdot \frac{dN_{zc}}{dt} \right) dt$$

$\alpha = 180/\pi$ being a coefficient for converting radians into degrees, $\tau_\gamma$ the aircraft's trajectory constant, and TAS the true air speed of the aircraft considered, and a high-pass filter restoring in the long term, to a constant value, the longitudinal attitude deviation instruction value provided by the integrator.

2. The converter as claimed in claim 1, wherein the time constant $\tau_w$ of the high-pass filter of the longitudinal attitude deviation instruction generator is of the order of 12 seconds, depending on the type of aircraft.

3. The converter as claimed in claim 1, wherein the integrator and the high-pass filter of the longitudinal attitude deviation instruction generator are combined into a first-order bandpass filter having a high cutoff frequency equal to $1/2\pi\tau_\gamma$, $\tau_\gamma$ being a trajectory constant for the aircraft, and a low cutoff frequency equal to $1/2\pi\tau_w$, $\tau_w$ associated with an amplifier-attenuator having a gain equal to:

$$\frac{\alpha\tau_w}{TAS}.$$

4. The converter as claimed in claim 3, wherein the time constant $\tau_w$ of the bandpass filter is of the order of 12 seconds, depending on the type of aircraft.

5. The converter as claimed in claim 3, wherein the first-order bandpass filter has a time constant $\tau_\gamma$ of the order of 2 seconds, depending on the aircraft.

6. The converter as claimed in claim 5, wherein the time constant $\tau_{w\theta}$ of the high-pass filter has a value of the order of that of the time constant $\tau_w$ of the first-order bandpass filter.

7. The converter as claimed in claim 1, the longitudinal attitude deviation instruction generator circuit further comprises:

a second high-pass filter receiving a current value of longitudinal attitude angle and tending to restore it to the zero value, a subtracter circuit with an additive input connected at the output of the second high-pass filter and a subtractive input connected at the output of the variable-gain integrator, and, a low-pass filter connected at the output of the subtractor circuit.

8. The converter as claimed in claim 7, wherein the longitudinal attitude deviation instruction generator circuit comprises adjustment amplifiers-attenuators inserted at the output of the second high-pass filter and at the output of the low-pass filter.

9. The converter as claimed in claim 8, wherein the low-pass filter possesses a first-order transfer function with a time constant $\tau_f$ of the order of 0.8 s.

* * * * *